(12) United States Patent
Hagen et al.

(10) Patent No.: US 7,211,747 B2
(45) Date of Patent: May 1, 2007

(54) BIN LIFTING AND WEIGH SCALE ARRANGEMENT

(75) Inventors: Martin H. Hagen, Guelph (CA); Jamie Robert Eyles, Cambridge (CA); Michael J. Mathews, Brantford (CA)

(73) Assignee: Shred-Tech Corporation, Cambridge, Ontario (CA)

( * ) Notice: Subject to any disclaimer, the term of this patent is extended or adjusted under 35 U.S.C. 154(b) by 162 days.

(21) Appl. No.: 10/924,972

(22) Filed: Aug. 25, 2004

(65) Prior Publication Data

US 2005/0051367 A1 Mar. 10, 2005

Related U.S. Application Data

(60) Provisional application No. 60/497,547, filed on Aug. 26, 2003.

(51) Int. Cl.
*G01G 19/08* (2006.01)

(52) U.S. Cl. .................. 177/136; 177/147; 177/255

(58) Field of Classification Search .......... 177/136, 177/147, 229, 255
See application file for complete search history.

(56) References Cited

U.S. PATENT DOCUMENTS

| | | | |
|---|---|---|---|
| 4,491,190 A * | 1/1985 | Mayfield | 177/139 |
| 4,824,315 A * | 4/1989 | Naab et al. | 414/408 |
| 4,854,406 A | 8/1989 | Appleton et al. | |
| 5,004,392 A | 4/1991 | Naab | |
| 5,092,416 A * | 3/1992 | Luechinger et al. | 177/229 |
| 5,178,226 A | 1/1993 | Bowman et al. | |
| 5,209,313 A | 5/1993 | Brodrick et al. | |
| 5,230,393 A | 7/1993 | Mezey | |
| 5,262,598 A * | 11/1993 | Stotler et al. | 177/229 |
| 5,344,272 A | 9/1994 | Nuyts | |
| 5,666,295 A * | 9/1997 | Bruns | 702/174 |
| 5,783,755 A | 7/1998 | Bruns | |
| 6,002,090 A | 12/1999 | Johnson et al. | |
| 6,232,566 B1 * | 5/2001 | Bruns | 177/139 |
| 6,598,010 B2 | 7/2003 | Zefira | |

FOREIGN PATENT DOCUMENTS

| | | |
|---|---|---|
| BE | 1013249 | 11/2001 |
| DE | 4134344 | 4/1993 |
| EP | 0 420 359 | 4/1991 |
| EP | 0 500 213 | 8/1992 |
| NL | 9201042 | 1/1994 |

\* cited by examiner

*Primary Examiner*—Randy W. Gibson
(74) *Attorney, Agent, or Firm*—R. Craig Armstrong; Borden Ladner Gervais LLP

(57) ABSTRACT

The present invention is directed at a bin lifting and weighing assembly comprising a bin lifting mechanism having means for engaging and lifting a bin; means for mounting the bin lifting mechanism against a structure; a load cell, mounted against the structure; for measuring a weight of the bins; wherein the means for mounting the bin lifting mechanism allows only a single degree of freedom such that the load cell remains in parallel with the structure.

11 Claims, 5 Drawing Sheets

BIN LIFTING AND WEIGH SCALE ARRANGEMENT

CROSS REFERENCE TO RELATED APPLICATIONS

This application claims the benefit of U.S. Provisional Application No. 60/497,547, filed Aug. 26, 2003, which is incorporated herein by reference.

FIELD OF THE INVENTION

The present invention relates generally to bin lifters. More particularly, the present invention relates to a bin lifting and weighing assembly.

BACKGROUND OF THE INVENTION

Mobile trash and refuse systems are known in the art and are generally used to collect large amounts of garbage or refuse from commercial or residential buildings. With some of these services, there is a cost to the building owners which generally is based on the weight of the trash or refuse being collected.

In many cases, the cost for this service is based on a flat monthly fee or set fee per removal. Therefore, regardless of the weight of the trash bin and contents being removed, the owner is charged the same amount. This is quite unfair if an owner is throwing away large items which are lightweight and is charged the same amount as an owner who has a similar sized item which weighs more. This is especially less reasonable when the trash or refuse is simply shredded documents since paper is lightweight. In this manner, owners may find alternatively methods to dispose of their garbage.

Rather than being charged a predetermined fee, it would be more beneficial for removal companies to have a garbage or refuse removal system which includes a way to measure the weight of the garbage or refuse being removed so that owners are charged by weight.

It is, therefore, desirable to provide a novel bin lifting and weighing assembly.

SUMMARY OF THE INVENTION

It is an object of the present invention to obviate or mitigate at least one disadvantage of previous bin lifting assemblies.

In one embodiment, the bin lifting mechanism is mounted to a support structure to produce a linear axial force on an integral load cell to accurately measure the weight of loads lifted in fixed applications and in mobile applications where angular orientation of the lift mechanism may not be exactly vertical. The mechanism facilitates rapid weight measurement and reduces the amount of parts required for handling motions associated with use of independent scales or devices.

A laminated leaf spring mounting arrangement is used and provides a stable geometry that is generally unaffected by static and dynamic frictional forces inherent in mechanical components of the bin lift mechanism. The bin lifting assembly also provides a positive mechanical connection that is able to absorb and withstand the dynamic shock loads of a mobile application.

In a first aspect, the present invention provides a means for mounting the bin lifting mechanism against a structure; a load cell, mounted against the structure; for measuring a weight of the bins; wherein the means for mounting the bin lifting mechanism allows only a single degree of freedom such that the load cell remains in parallel with the structure.

In a further embodiment, there is provided a weighing assembly comprising means for attaching the weighing assembly to a support structure; means for receiving an item to be weighed; a load cell, mounted against the structure and to the means for receiving an item to be weighed; for weight measurements; wherein the means for attaching the weighing assembly allows only a single degree of freedom such that the load cell remains in parallel with the support structure.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Generally, the present invention provides apparatus for a bin lifting and weighing assembly. The bin lifting and weighing assembly may be attached to a support structure such as a wall of a truck or the sidewall of a large receptacle.

Figure 1:
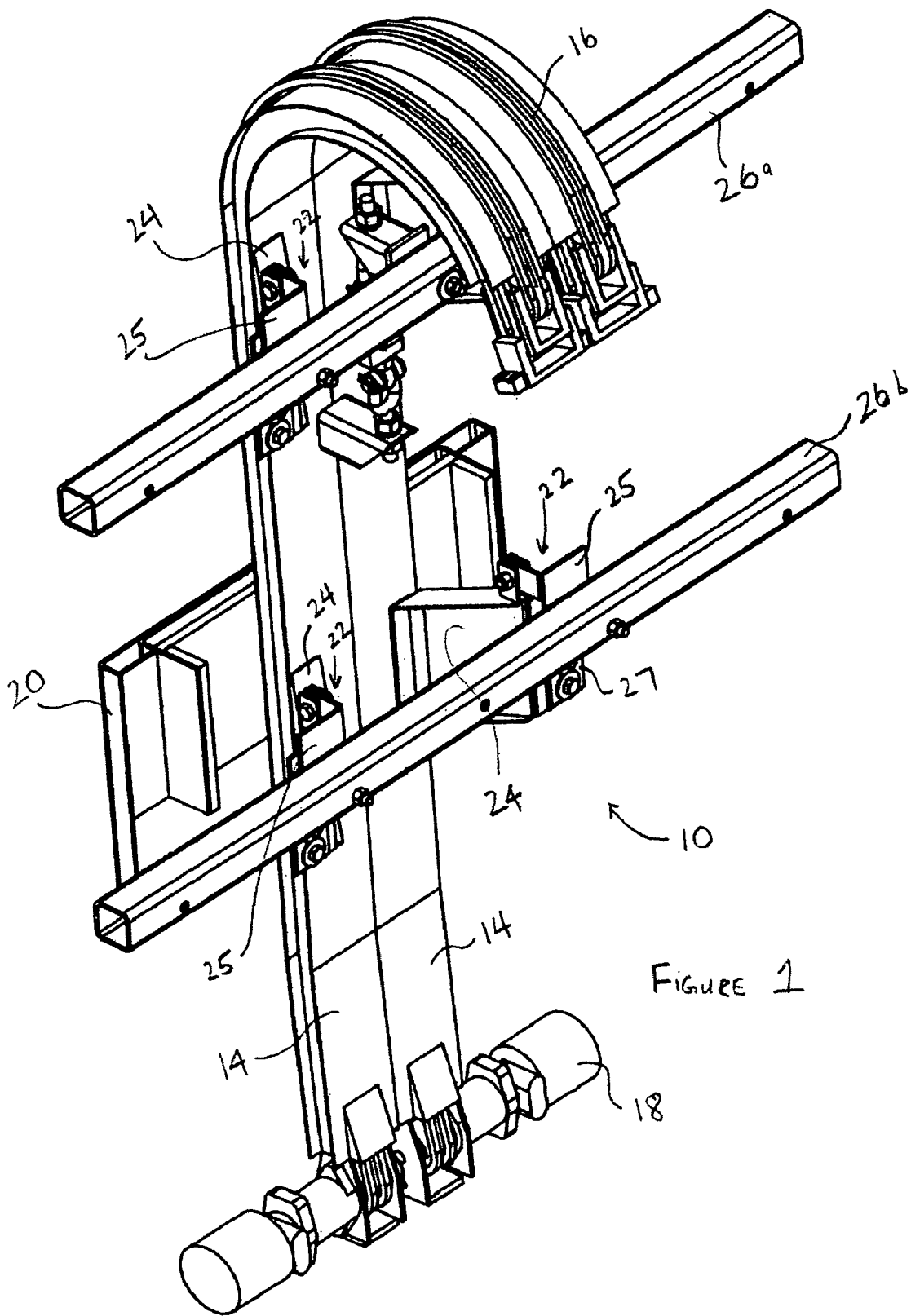
FIG. 1 is a perspective view of a bin lifting and weighing assembly.

Turning to FIG. 1, a schematic diagram of a first embodiment of a bin lifting and weighing assembly for attachment to a truck is shown. The assembly 10 comprises a bin lifting mechanism 12 including a pair of, preferably cane shaped, guide rails 14. The bin lifting mechanism 12 further comprises a pair of chains 16, preferably double lift, which are integrated within the pair of guide rails 14 and powered by independent drive motors 18 The chains 16 and the motors 18 operate in tandem to drive a carriage 20 from a first, lowered, position to a second, raised, position along the guide rails 14. In operation, a bin (not shown) is fastened to the carriage 20 via fastening means, such as a hook and a lock, when the carriage 20 is in the first position and then lifted to the second position so that the contents of the bin may be dumped out. Although the bin lifting mechanism 12 has been shown with chains 16 and motors 18, it will be understood that the bin lifting mechanism may also use extension cylinders or electric actuators to lift the bin from the first position to the second position. Such bin lifting mechanisms will be well known to one skilled in the art.

In order to mount the bin lifting mechanism 12 to a support structure, such as a truck wall, the assembly 10 comprises mounting means 22 which includes mounting ears 24. In the preferred embodiment, there are four sets of mounting means 22 with two mounting ears 24 located on each of the guide rails 14. The mounting means 22 also comprise stacked leaf springs 23, preferably a laminated set of three, which provide support for the bin lifting and weighing assembly 10. The leaf springs 23 allow the bin lifting and weighing assembly to only travel in a single degree of freedom, preferably in the vertical direction, which means that any movement by the bin or support structure during the lifting and weighing process is in the vertical direction. Mounting brackets 25 are also used to assisting in the mounting of the assembly 10.

The mounting means 22 are selected such that they only allow movement of the assembly in one direction, namely vertical. By providing only one degree of freedom of movement, regardless of the movement of the support structure, the weight of the bin and its contents, or payload, may be more accurately measured. This will be described in more detail below.

When the assembly 10 is mounted to the support structure, such as a mobile shredding truck, the assembly 10 is attached to a pair of mounting bars 26 so that the mounting bars 26 provide further support to the assembly. The mounting bars 26 provide support to the entire assembly to reduce deflection by the assembly during the lifting and weighing process and are preferably perpendicular to the guide rails 14. As more clearly shown in FIG. 2, when the bin lifting and weighing assembly 10 is mounted against a support structure, the mounting bars 26 are located on the opposite side of a truck wall 28 away from the assembly 10 to provide further support to the mounted assembly 10. In this embodiment, fastening means such as screws are used to fasten the assembly to the mounting bar 26 through the truck wall 28.

Figure 2:
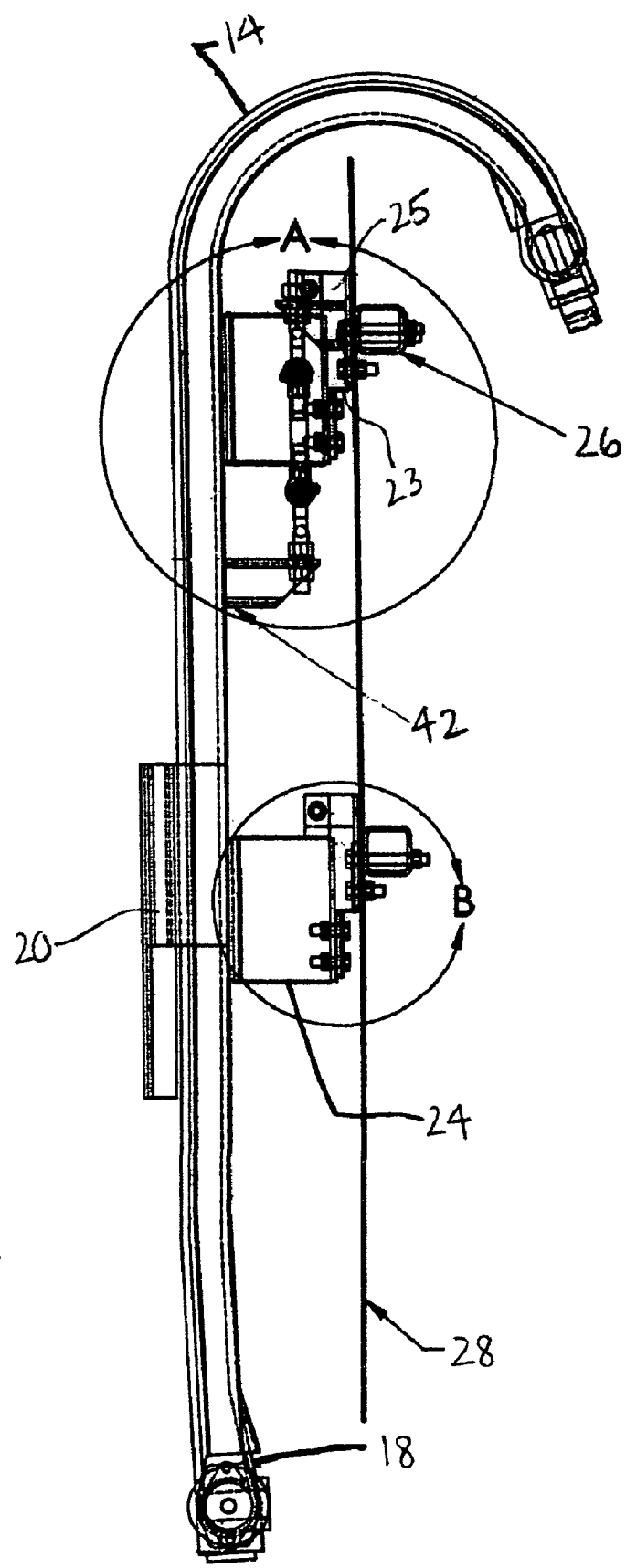
FIG. 2 is a side view of the bin lifting and weighing assembly mounted to a support structure.
Figure 4:
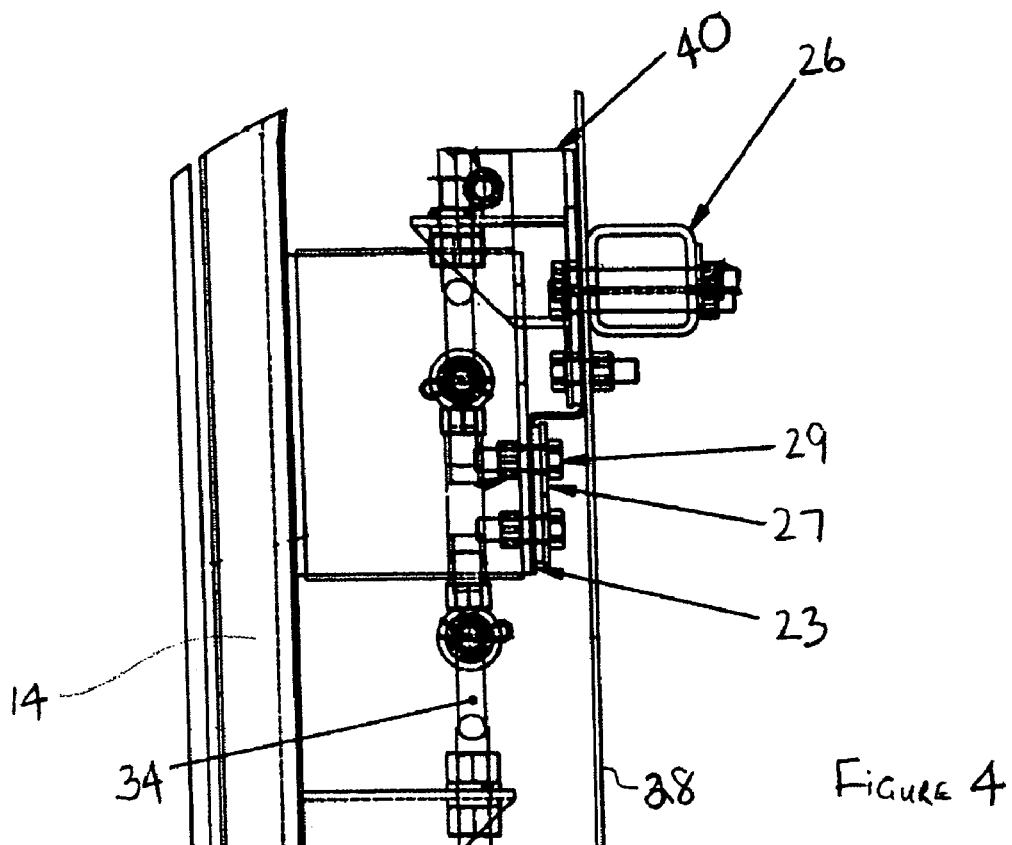
FIG. 4 is a detailed side view of upper mounting means and the load cell mounted to the support structure in accordance with an embodiment of the invention.
Figure 5:
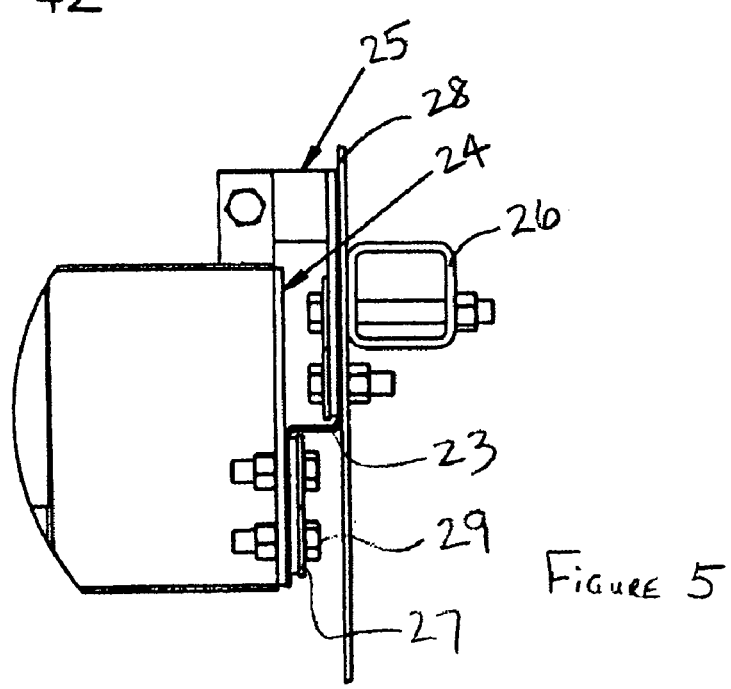
FIG. 5 is a side view of lower mounting means mounted to the support structure in accordance with an embodiment of the invention.

As more clearly shown in FIGS. 4 and 5, which are enlarged schematics of the circles in FIG. 2, the leaf springs 23 are attached to the mounting bars 26 via the mounting bracket 25 while the mounting ear 24 is attached to the clamp plate 27 with the leaf spring 23 therebetween via fastening means 29.

Figure 3:
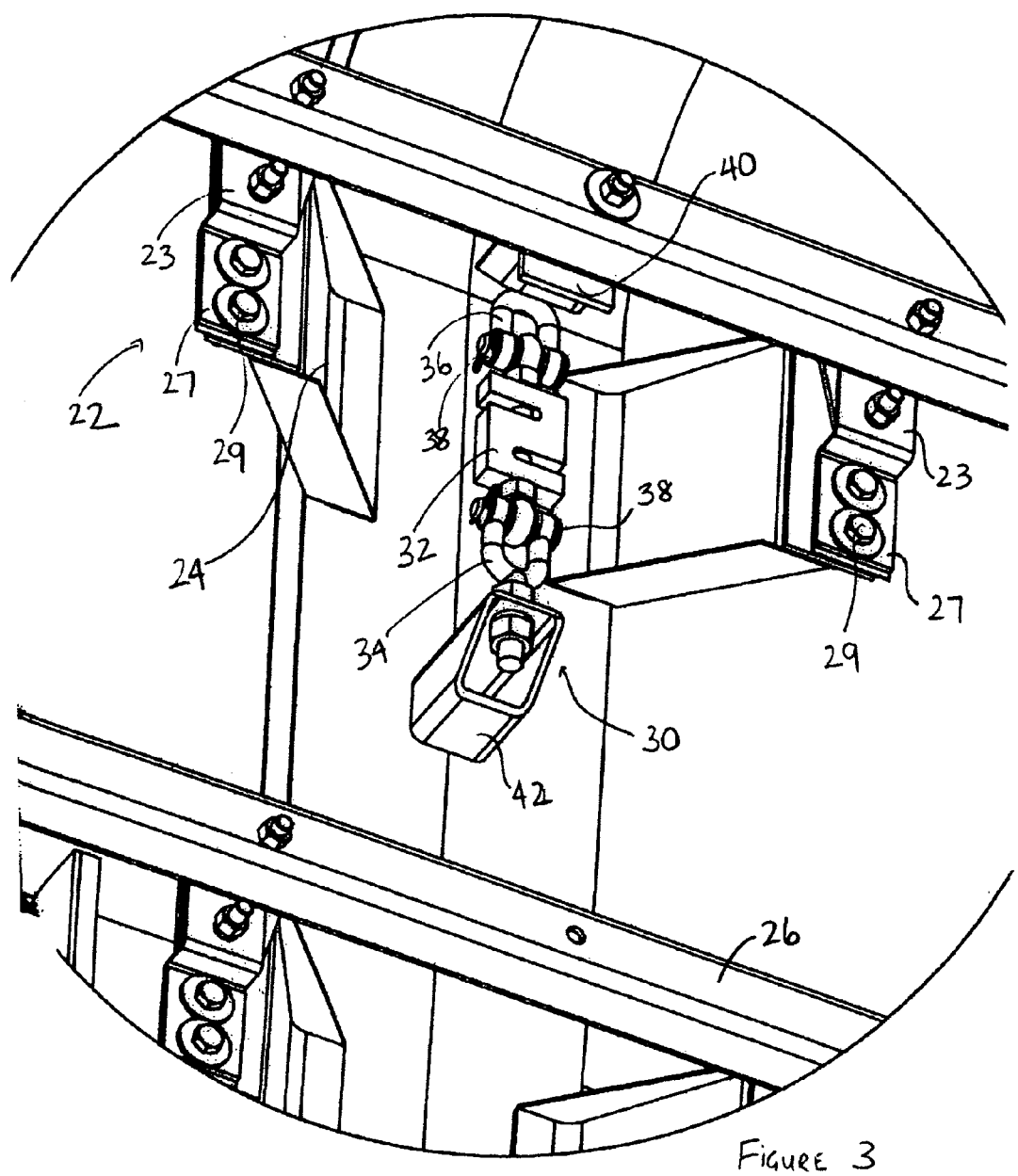
FIG. 3 is an enlarged schematic view of a load cell and mounting means.

In order to weigh the contents in the bin, along with the bin, the bin lifting and weighing assembly 10 further comprises weighing means 30. The weighing means 30 comprises a load cell 32 which is preferably mounted in a vertical orientation (to the ground) between a first yoke 34 and a second yoke 36 as more clearly shown in FIG. 3 which is an enlarged schematic diagram of the weighing means. Anti-friction bearings 38 are also mounted at the joints between the yokes 34 and 36 and the load cell 32 in order to reduce the forces acting on the load cell which may affect the measurement of the bin and its contents.

The second yoke 36 is anchored to a base structure 40 mounted to one of the mounting bars 26a while the first yoke 34 is attached to the guide rails 14 via a connecting structure 42.

The load cell 32 measures the combined weight load of the bin lifting mechanism and the bin along with the payload (contents) within the bin. By having the load cell 32 and the mounting means 22 anchored to the same support structure, any movement by the support structure causes a similar motion by the load cell 32 and the mounting means 22. By maintaining the load cell 32 in axial alignment with the plane of the support structure, the weight measurements measured by the load cell 32 are more accurate than other prior art systems since the forces acting on the bin and its contents is restricted to the vertical direction. Furthermore, in the present invention, only a single load cell is required to obtain a weight measurement of the bin and its contents while many prior art systems require multiple load cells. The leaf springs 23 limit the side-to-side motion of the bin during the lifting process and allow only unidirectional deflection parallel to the force being experience by the load cell 32.

In order to assist in the weighing process, the mounting ears 24 distribute the forces experienced by the lifting assembly so that the force is shared over the assembly 10 to reduce the wear and tear on the parts of the assembly.

Figure 6:
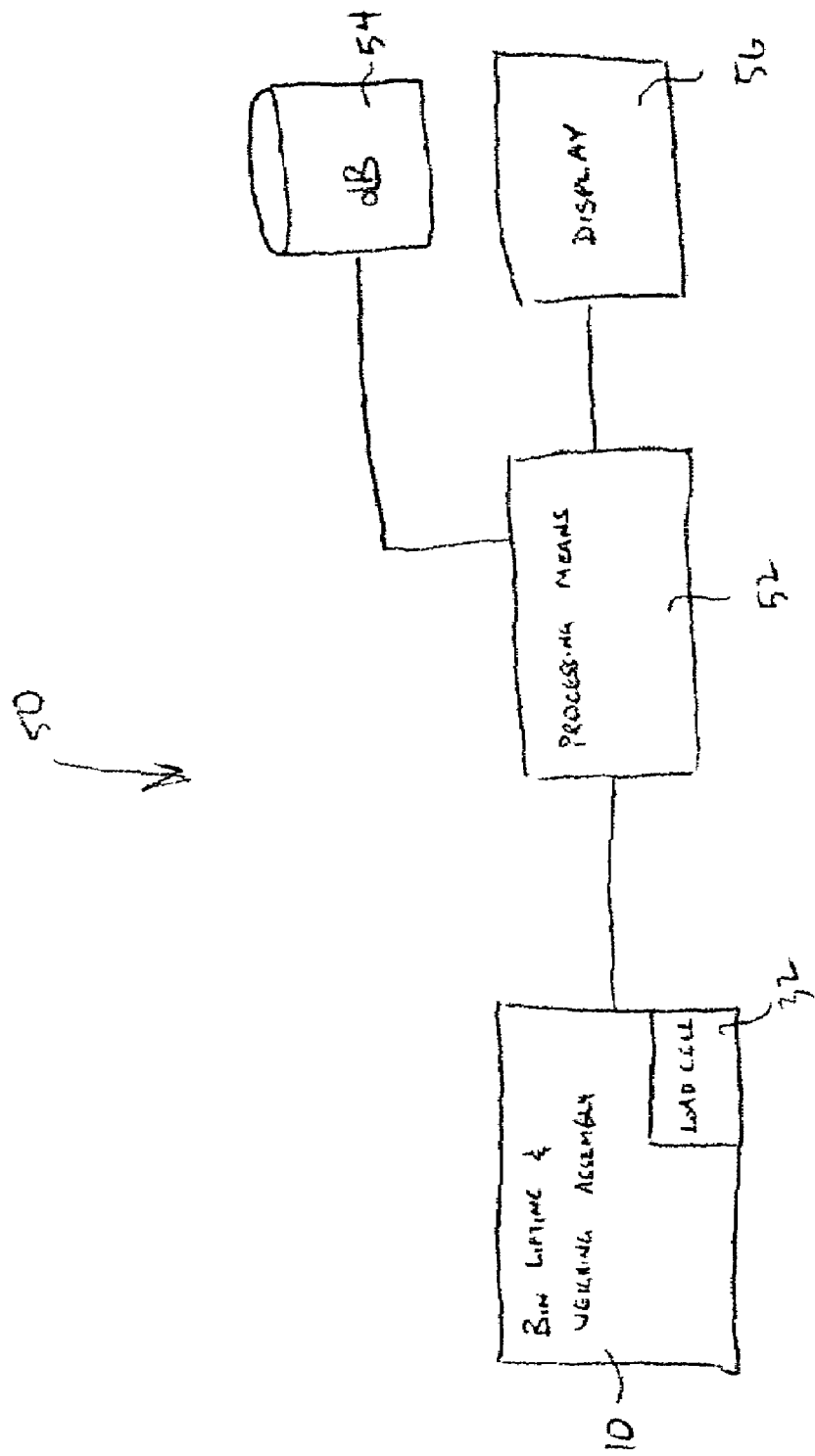
FIG. 6 is a schematic diagram of a second embodiment of the bin lifting and weighing assembly.

Turning to FIG. 6, a second embodiment of the bin lifting and weighing assembly is shown including apparatus for displaying or recording the measured weight is shown. The apparatus 50 comprises the bin lifting and weighting assembly 10 (as described above) with the load cell 32. The load cell 32 communicates with a processing means 52 which is connected to a database 54 and/or a display 56 such as an LCD display.

In operation, in one embodiment, a bin, containing material which is to be measured and dumped, is attached to the carriage 20 of the bin lifting and weighing assembly 20 while the carriage 20 is in the first, lowered, position. A bin lifting and weighing assembly operator then activates the assembly 10 to move the bin from the first, lowered, position to the second, raised, position. At a predetermined location, operation of the assembly is halted and a weight measurement taken by the load cell 32 The load cell 32 then transmits an electric signal corresponding to the measured weight which is then received by the processing means 52 and displayed on a display 56 or stored in a database 54. After the weight measurement has been retrieved, the operator re-starts the assembly 10 and the bin travels to the second, raised, position where the contents are dumped into a larger receptacle.

As will be understood, during the lifting process, the mounting means 22 only allow movement of the assembly, including the bin, in the vertical direction so more accurate measurements are retrieved by the load cell 32.

Alternatively, the measurements may be taken dynamically without having to stop the lifting process so that the entire lifting and weighing process may be automated without requiring operator assistance outside of the initial attachment of the bin and the initiation of the lifting and weighing process.

Furthermore, the processing and display means described above may be a programmable logic control and a screen or a dedicated display corresponding to the load cell. In another embodiment, the electrical signal produced by the load cell (representing the weight measurement) may be transmitted directly or over a telemetry system to a main computer, acting as a processor, which automatically records the measurement and stores it in a database for further processing or displays it to a screen.

An advantage of the present invention is that it is less costly to manufacture since the parts are readily available to builders and only one load cell is required.

Alternatively, it will be understood that the bin lifting assembly may only require a single guide rail. The number of guide rails and lift chains required for the bin lifting assembly is determined by the size and weight of bins which the assembly is designed to lift. Therefore, for smaller and lighter bins, only one guide rail may be used while for larger bins, the double guide rail system may be employed. Similarly, the number of mounting ears may be variable to suit the bin lifting assembly requirements.

Other bin lifting mounting arrangements that produce similar desired characteristics of providing lateral support while also providing linear axial force on the load cell may include double hinge, sliding connection or linear bearings.

Furthermore, the use of the leaf springs reduces the likelihood of an overturning moment occurring.

Alternatively, if the support structure is a rigid mounting surface, there may be no need for the mounting bars 26 and the mounting means 22 may be fastened directly to the stationary wall since there is less opportunity that the support structure will move during the bin lifting and weighing process.

The design is flexible and suitable for mounting bin lifter that may be constructed in other designs common to the art. The structure is robust and suitable for use in industrial and mobile applications where shock loads are probable. A typical application, for example, is a mobile shredding truck where the bin lifting is used to lift bins full of material to be shredded on location.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A bin lifting and weighing assembly, comprising:
   a support structure;
   guide means adjacent said support structure, said guide means having at least a generally vertical portion;
   a carriage movably secured to said guide means for movement thereon, said carriage having means extending therefrom to lift a bin;
   actuation means connected for moving said carriage on said guide means;
   a resilient connection between said guide means and said support structure, said resilient connection permitting only limited generally vertical deflection of said guide means relative to said support structure; and
   at least one load cell mounted to receive load produced by said deflection of said guide means relative to said support structure, whereby a bin can be lifted by operation of said motor to raise said carriage and whereby the bin can be weighed by said load cell measuring load once the bin has been lifted.

2. A bin lifting and weighing assembly as in claim 1, wherein said resilient connection comprises at least one leaf spring between said guide means and said support structure.

3. A bin lifting and weighing assembly as in claim 1, wherein said guide means comprises at least one guide rail having a generally vertical lower portion and a curved upper portion, whereby said carriage rotates upon reaching said curved upper portion, so as to tip any bin carried thereby.

4. A bin lifting and weighing assembly as in claim 2, wherein said actuation means comprises at least one motor connected to drive, in each said guide rail, a chain running within said guide rail, said carriage being secured to said chain.

5. A bin lifting and weighing assembly as in claim 4, wherein there are two said guide rails each with a said chain, and wherein there are two said motors, each connected to drive one of said chains.

6. A bin lifting and weighing assembly as in claim 1, wherein said resilient connection comprises at least one leaf spring between said guide means and said support structure, wherein said guide means comprises at least one guide rail having a generally vertical lower portion and a curved upper portion, whereby said carriage rotates upon reaching said curved upper portion, so as to tip any bin carried thereby.

7. A bin lifting and weighing assembly as in claim 6, wherein said actuation means comprises at least one motor connected to drive, in each said guide rail, a chain running within said guide rail, said carriage being secured to said chain.

8. A bin lifting and weighing assembly as in claim 7, wherein there are two said guide rails each with a said chain, and wherein there are two said motors, each connected to drive one of said chains.

9. A bin lifting and weighing assembly as in claim 1, wherein said support structure is a vehicle.

10. A bin lifting and weighing assembly as in claim 9, wherein said vehicle is a mobile shredding truck.

11. A bin lifting and weighing assembly as in claim 1, further comprising control and monitoring apparatus, configured to display the weight of bins lifted, and to record said weights and store same in a database.

* * * * *